(12) United States Patent
Choi

(10) Patent No.: US 8,767,499 B2
(45) Date of Patent: Jul. 1, 2014

(54) SEMICONDUCTOR MEMORY DEVICE

(75) Inventor: Dae-Il Choi, Gyeonggi-do (KR)

(73) Assignee: Hynix Semiconductor Inc., Gyeonggi-do (KR)

(*) Notice: Subject to any disclaimer, the term of this patent is extended or adjusted under 35 U.S.C. 154(b) by 267 days.

(21) Appl. No.: 13/330,223

(22) Filed: Dec. 19, 2011

(65) Prior Publication Data

US 2012/0275240 A1    Nov. 1, 2012

(30) Foreign Application Priority Data

Apr. 29, 2011  (KR) .......................... 10-2011-0040807

(51) Int. Cl.
*G11C 8/00*   (2006.01)
*G06F 21/79*  (2013.01)

(52) U.S. Cl.
CPC ..................................... *G06F 21/79* (2013.01)
USPC ................................. 365/230.06; 365/230.04

(58) Field of Classification Search
CPC ....................................................... G06F 21/79
USPC .......................... 365/230.06, 230.04, 230.01
See application file for complete search history.

(56) References Cited

U.S. PATENT DOCUMENTS

| | | | | |
|---|---|---|---|---|
| 5,943,283 A | * | 8/1999 | Wong et al. | 365/230.01 |
| 2005/0207206 A1 | * | 9/2005 | Coulson et al. | 365/145 |
| 2008/0151618 A1 | * | 6/2008 | Sharon et al. | 365/185.02 |

* cited by examiner

*Primary Examiner* — Vu Le
(74) *Attorney, Agent, or Firm* — IP & T Group LLP

(57) ABSTRACT

A semiconductor memory device includes a random address generation unit configured to receive a multi-bit source address and generate a multi-bit random address and a signal mixing unit configured to mix the multi-bit random address with a data, wherein the random address generation unit has a plurality of transmission lines configured to electrically connect the plurality of input terminals respectively corresponding to bits of the source address and the plurality of output terminals respectively corresponding to bits of the random address in one-to-one correspondence regardless of an order of the bits of the source address.

5 Claims, 2 Drawing Sheets

SEMICONDUCTOR MEMORY DEVICE

CROSS-REFERENCE TO RELATED APPLICATIONS

The present application claims priority of Korean Patent Application No. 10-2011-0040807, filed on Apr. 29, 2011, which is incorporated herein by reference in its entirety.

BACKGROUND

1. Field

Exemplary embodiments of the present invention relate to a semiconductor designing technology, and more particularly, to a semiconductor memory device for storing data in memory cells.

2. Description of the Related Art

In general, semiconductor memory devices are divided into volatile memory devices, such as Dynamic Random Access Memory (DRAM) devices and Static Random Access Memory (SRAM) devices, and non-volatile memory devices, such as Programmable Read Only Memory (PROM) devices, Erasable PROM (EPROM) devices, and flash memory devices. Non-volatile memory devices and volatile memory devices are distinguished based on whether the data stored in a memory cell is retained or not after a certain time passes from the storage of the data. In other words, the non-volatile memory devices retain the data stored in a memory cell, whereas the volatile memory devices lose the data stored in a memory cell as time passes. The volatile memory devices perform a refresh operation essentially to maintain data. On the other hand, the non-volatile memory devices may not perform a refresh operation. Since such a feature of the non-volatile memory devices is appropriate for low power consumption and high integration, the non-volatile memory devices are widely used as storage media of portable devices.

Meanwhile, as the fabrication technology of semiconductor memory devices has advanced, the integration degree of semiconductor memory devices has been increased greatly. The increase in the integration degree has decreased the chip size of semiconductor memory devices and eventually, the space between the memory cells disposed therein has become narrow. The space has become so narrow that the data stored in one memory cell may affect the data of the adjacent memory cells, and a technology of randomly storing data to minimize the interference between the adjacent memory cells is being developed. The core part of the data randomizing technology includes a linear feedback shift register that generates a random value and an initial value generation circuit that generates a random initial value for address mapping.

The linear feedback shift register and the initial value generation circuit may occupy a relatively wide area, and the control of the linear feedback shift register and the initial value generation circuit is quite complicated. As described above, the linear feedback shift register and the initial value generation circuit are essential constituent elements in the conditions that semiconductor memory devices are being integrated higher and higher. However, since the linear feedback shift register and the initial value generation circuit occupy a large area, their use in a semiconductor memory device is difficult to implement.

SUMMARY

An embodiment of the present invention is directed to a semiconductor memory device that performs a data randomizing operation by using an address without a linear feedback shift register and an initial value generation circuit.

In accordance with an embodiment of the present invention, a random address generation apparatus includes: a plurality of input terminals configured to receive a multi-bit source address; a plurality of output terminals configured to output a multi-bit random address; and a plurality of transmission lines configured to electrically connect the plurality of input terminals and the plurality of output terminals in one-to-one correspondence regardless of an order of bits of the source address.

In accordance with another embodiment of the present invention, a semiconductor memory device includes: a random address generation unit configured to receive a multi-bit source address and generate a multi-bit random address; and a signal mixing unit configured to mix the multi-bit random address with a data, wherein the random address generation unit includes a plurality of transmission lines configured to electrically connect the plurality of input terminals respectively corresponding to bits of the source address and the plurality of output terminals respectively corresponding to bits of the random address in one-to-one correspondence regardless of an order of the bits of the source address.

DETAILED DESCRIPTION

Figure 1:
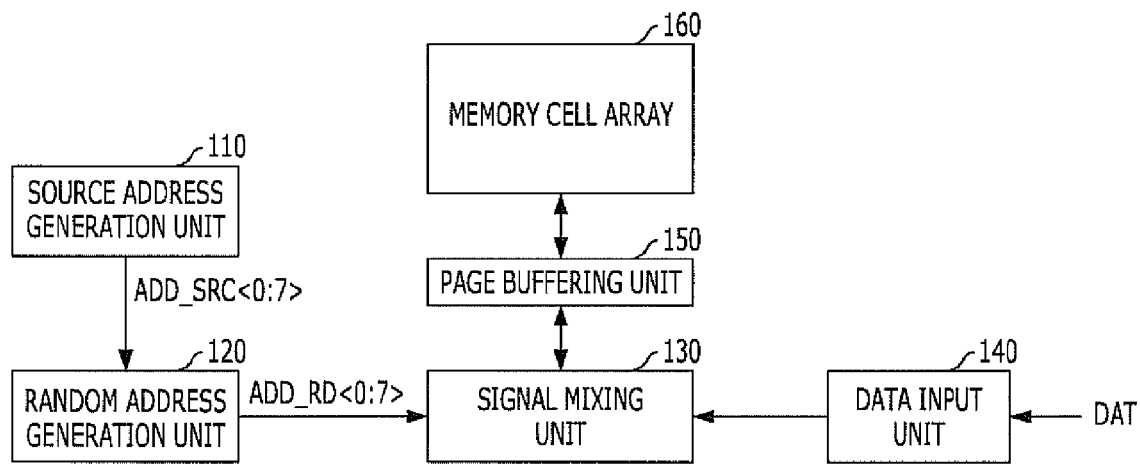
FIG. 1 is a block view illustrating a semiconductor memory device in accordance with an embodiment of the present invention.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

FIG. 1 is a block view illustrating a semiconductor memory device in accordance with an embodiment of the present invention.

Referring to FIG. 1, the semiconductor memory device includes a source address generation unit 110, a random address generation unit 120, a signal mixing unit 130, a data input unit 140, a page buffering unit 150, and a memory cell array 160.

The source address generation unit 110 generates a source address ADD_SRC<0:7> that is formed of a plurality of bits. A column address counter or a circuit that generates an address in response to a clock signal may be used as the source address generation unit 110.

The random address generation unit 120 includes a plurality of input terminals, a plurality of output terminals, and transmission lines for electrically connecting the input terminals with the output terminals in one-to-one correspondence. The random address generation unit 120 receives the source address ADD_SRC<0:7> and generates a random address ADD_RD<0:7> by transmitting the bits of the received source address ADD_SRC<0:7> through the transmission lines that electrically connect the input terminals with the output terminals in one-to-one correspondence, regardless of the order of the bits of the source address ADD_SRC<0:7>. Here, the random address ADD_RD<0:7> has a different address value from the source address ADD_SRC<0:7>.

Whereas a conventional semiconductor memory device uses a linear feedback shift register and an initial value generation circuit to generate an address for a data randomizing operation, the semiconductor memory device in accordance with the embodiment of the present invention may generate a random address ADD_RD<0:7> that may be used for a data randomizing operation by using the random address generation unit 120 provided with the transmission lines that electrically connect the input terminals with the output terminals. The random address generation unit 120 will be described in detail below. Since the random address generation unit 120 is a circuit that occupies a relatively small area, it is favorable to design a circuit.

The signal mixing unit 130 mixes the random address ADD_RD<0:7> with a data DAT inputted through the data input unit 140 and outputs a signal to the page buffering unit 150. Here, the data input unit 140 is a circuit for receiving the data DAT that is inputted from the outside, and the page buffering unit 150 is a circuit that stores data in the memory cell array 160 or outputting data from the memory cell array 160 by performing a read operation or a write operation.

Figure 2:
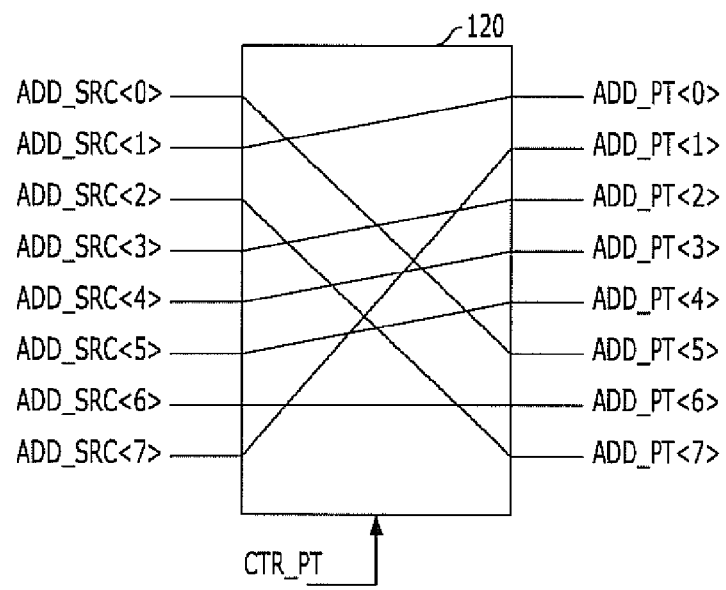
FIG. 2 illustrates a random address generation unit 120 of FIG. 1.

FIG. 2 illustrates a random address generation unit 120 of FIG. 1.

Referring to FIG. 2, the random address generation unit 120 receives the source address ADD_SRC<0:7> that is formed of a plurality of bits and outputs the random address ADD_RD<0:7> that is also formed of a plurality of bits. The bits of the source address ADD_SRC<0:7> and the bits the random address ADD_RD<0:7> have one-to-one correspondence through the transmission lines. FIG. 2 shows an example of the one-to-one correspondences between the source address ADD_SRC<0:7> and the random address ADD_RD<0:7>. To be specific, a first bit of the source address ADD_SRC<0> corresponds to a sixth bit of the random address ADD_RD<5>, and a second bit of the source address ADD_SRC<1> corresponds to a first bit of the random address ADD_RD<0>. Also, a third bit of the source address ADD_SRC<2> corresponds to an eighth bit of the random address ADD_RD<7>, and the other bits of the source address respectively correspond to the other bits of the random address.

In short, the random address generation unit 120 receives the source address ADD_SRC<0:7> and generates the random address ADD_RD<0:7> by transmitting the source address ADD_SRC<0:7> through transmission lines that electrically connect the input terminals of the random address generation unit 120 with the output terminals of the random address generation unit 120 as shown in FIG. 2. Therefore, the random address ADD_RD<0:7> becomes an address that is acquired by rearranging the order of the bits of the source address ADD_SRC<0:7>. This signifies that the source address ADD_SRC<0:7> and the random address ADD_RD<0:7> have different address values.

Meanwhile, the random address generation unit 120 in accordance with the embodiment of the present invention may receive a pattern control signal CTR_PT and multiplexes the transmission lines. In short, FIG. 2 shows just one example of the transmission lines that electrically connect the input terminals of the random address generation unit 120 with the output terminals of the random address generation unit 120, and the electrical connection may be changed in response to the pattern control signal CTR_PT.

Figure 3:
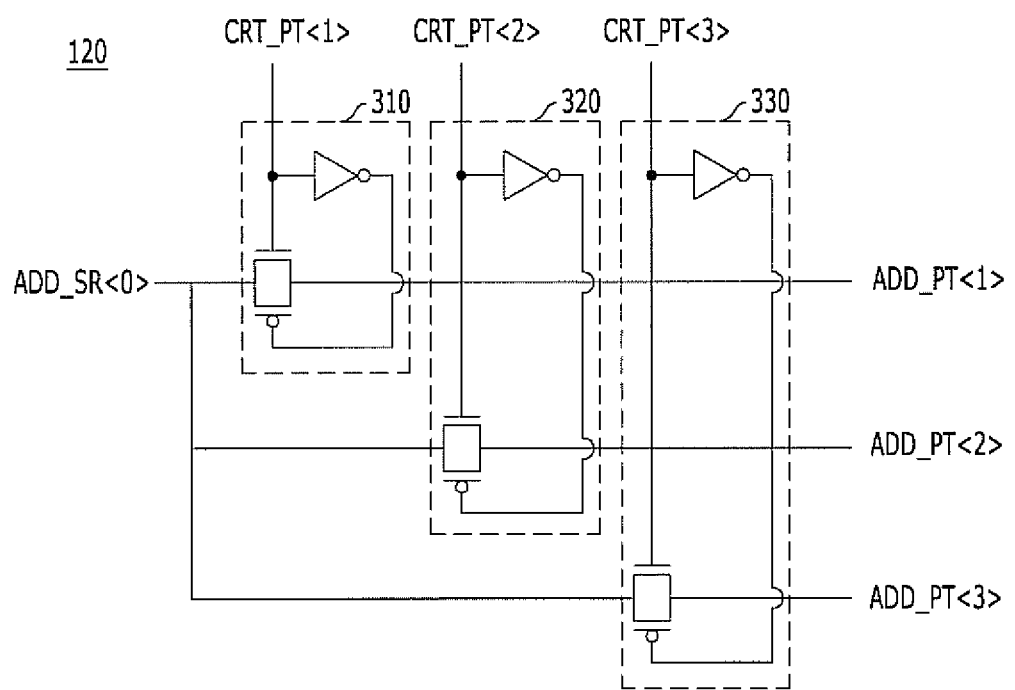
FIG. 3 is a circuit diagram illustrating the random address generation unit 120 of FIG. 2.

FIG. 3 is a circuit diagram illustrating the random address generation unit 120 of FIG. 2. For the purpose of description, FIG. 3 shows a structure corresponding to the source address ADD_SRC<0> of the source address ADD_SRC<0:7>.

Referring to FIG. 3, the random address generation unit 120 multiplexes the transmission lines shown in FIG. 2 in response to first to third pattern control signals CTR_PT<1:3>. Here, it is described as an example that the random address generation unit 120 has a structure of multiplexing the first bit of the source address ADD_SRC<0> into a second bit of the random address ADD_RD<1>, a third bit of the random address ADD_RD<2>, and a fourth bit of the random address ADD_RD<3>. Accordingly, the random address generation unit 120 includes first to third transmitters 310, 320 and 330.

Here, the first transmitter 310 transmits the first bit of the source address ADD_SRC<0> as the second bit of the random address ADD_RD<1> in response to the first pattern control signal CTR_PT<1>, and the second transmitter 320 transmits the first bit of the source address ADD_SRC<0> as the third bit of the random address ADD_RD<2> in response to the second pattern control signal CTR_PT<2>. The third transmitter 330 transmits the first bit of the source address ADD_SRC<0> as the fourth bit of the random address ADD_RD<3> in response to the third pattern control signal CTR_PT<3>. In short, the output path of the first bit of the source address ADD_SRC<0> is multiplexed in response to the first to third pattern control signals CTR<1:3>. The operation is performed for each source address ADD_SRC<0:7>. After all, the one-to-one correspondence of the transmission lines between the input terminals of the random address generation unit 120 and the output terminals of the random address generation unit 120 is changed in response to the first to third pattern control signals CTR_PT<1:3>.

As described above, the semiconductor memory device in accordance with the embodiment of the present invention may re-arrange the order of the bits of the source address ADD_SRC<0:7> by using the transmission lines between the input terminals of the random address generation unit 120 with the output terminals of the random address generation unit 120. The generated random address ADD_RD<0:7> may be used for a data randomizing operation.

According to an embodiment of the present invention, the chip size of a semiconductor memory device may be minimized by minimizing the size of a circuit that is used for a data randomizing operation.

While the present invention has been described with respect to the specific embodiments, it will be apparent to those skilled in the art that various changes and modifications may be made without departing from the spirit and scope of the invention as defined in the following claims.

Moreover, the logic gate and transistor illustrated in the embodiment of the present invention may be realized in different positions or types depending on the polarity of an input signal.

What is claimed is:

1. A semiconductor memory device, comprising:
   a random address generation unit configured to receive a multi-bit source address and generate a multi-bit random address; and
   a signal mixing unit configured to mix the multi-bit random address with a data,
   wherein the random address generation unit includes a plurality of transmission lines configured to electrically connect the plurality of input terminals respectively corresponding to bits of the source address and the plurality of output terminals respectively corresponding to bits of the random address in one-to-one correspondence regardless of an order of the bits of the source address.

2. The semiconductor memory device of claim 1, wherein the source address is a column address.

3. The semiconductor memory device of claim 1, further comprising:
   a page buffering unit configured to receive an output of the signal mixing unit and perform a read operation and a write operation onto a memory cell array.

4. The semiconductor memory device of claim 2, further comprising:
   a column address counter configured to generate the source address.

5. The semiconductor memory device of claim 2, further comprising:
   a circuit configured to generate the source address in response to a clock signal.

* * * * *